United States Patent [19]
Smith

[11] 3,916,181
[45] Oct. 28, 1975

[54] ILLUMINATED PROPELLER DECORATIVE LIGHT

[76] Inventor: Addison J. Smith, R.R. No. 1, Box 38, Tell City, Ind. 47586

[22] Filed: Dec. 30, 1974

[21] Appl. No.: 537,464

[52] U.S. Cl. ............... 240/10.6 R; 240/10.1 R
[51] Int. Cl.² ........................................ F21L 7/00
[58] Field of Search ....... 240/10.1 R, 10.6 R, 10.66, 240/10.67, 10 R

[56] References Cited
UNITED STATES PATENTS

| | | | |
|---|---|---|---|
| 1,504,003 | 8/1924 | Trumbull | 240/10.6 R |
| 1,608,909 | 11/1926 | Senior | 240/10.1 |
| 1,671,770 | 5/1928 | Levien | 240/10.1 |
| 1,839,055 | 12/1931 | Seegelken | 240/10.1 |
| 1,876,625 | 9/1932 | Daugherty | 240/10.1 |
| 2,550,988 | 5/1951 | Flournoy | 240/10.6 R |

*Primary Examiner*—Monroe H. Hayes
*Attorney, Agent, or Firm*—Bacon & Thomas

[57] ABSTRACT

A decorative light assembly comprises a battery shell having a hollow axle member attached to one end, the axle having light transmitting areas circumferentially spaced about its periphery and a propeller assembly rotatably secured to an outer circumference of the axle member. The propeller assembly includes propeller blade elements having light transmitting portions or the blade elements may be entirely constructed of light transmitting material. The blade elements are joined to a propeller hub which includes light transmitting areas where the propeller blades and hub are joined together. The hub is disposed over the portion of the axle member including the light transmitting areas, so that illumination from an energized light source within the axle member is transmitted through each propeller blade when the blade is radially aligned with a light transmitting area of the axle member. Different colored light filters may be provided in each light transmitting area of the axle member so that a propeller transmits a different colored light as it crosses over each light transmitting area of the axle member.

10 Claims, 4 Drawing Figures

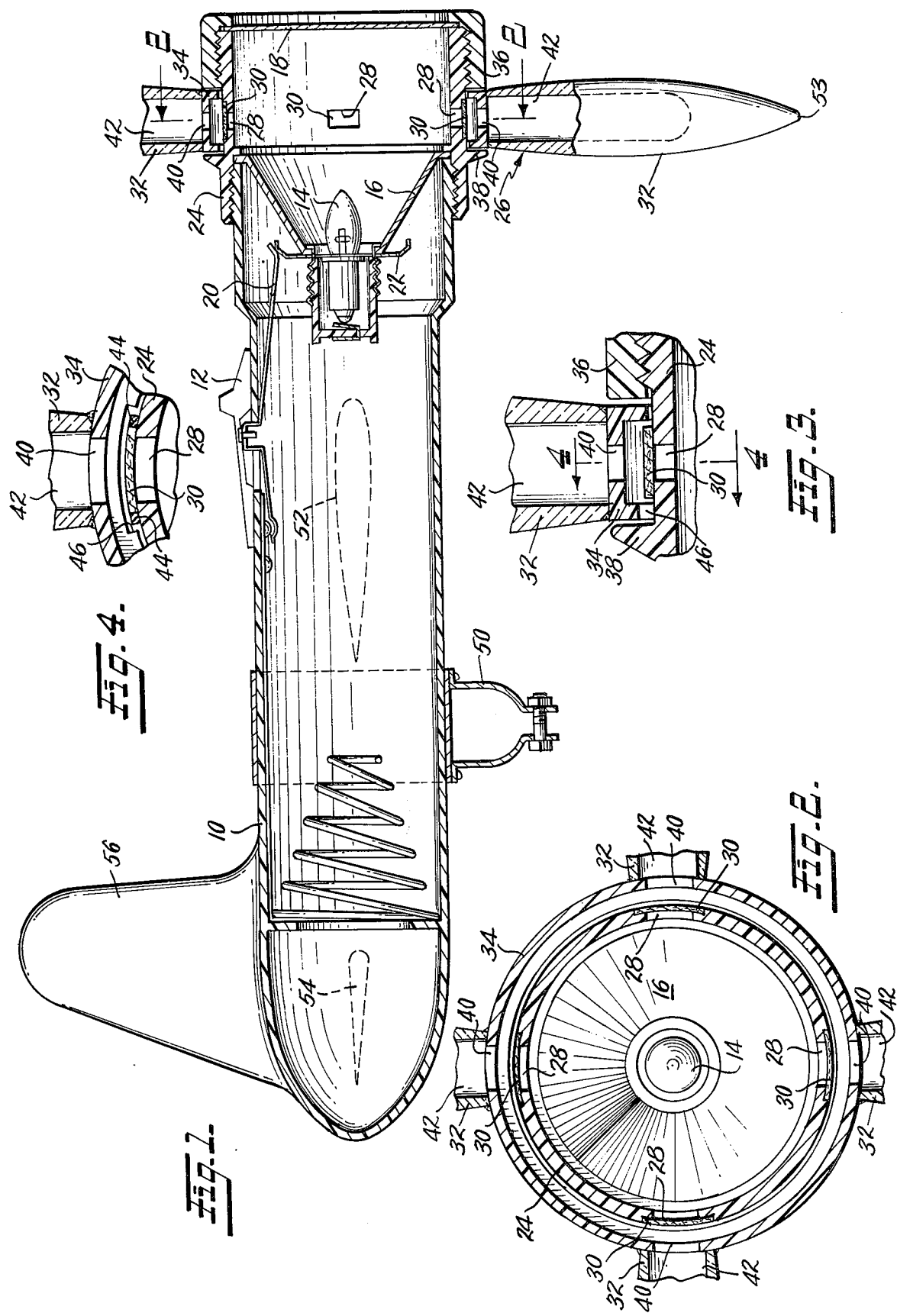

ILLUMINATED PROPELLER DECORATIVE LIGHT

BACKGROUND OF THE INVENTION

The present invention is a decorative light assembly which may also serve as a safety light for bicycles or other small vehicles. The principal feature is a whirling, wind driven propeller assembly which is illuminated by colored light from a stationary, central light source and which transmits the light interiorly of the propeller blades because of their construction.

Animated light displays and wind driven elements associated with light displays intended for use on vehicles are generally known in the prior art. For example, U.S. Pat. Nos. 575,199, 1,608,909, 1,839,055 and 1,876,625 all show such light displays featuring a wind driven propeller. However, applicant has conceived a revolving propeller light display wherein the propeller blades themselves are illuminated interiorly while they rotate about a stationary light source. Moreover, applicant has recognized the advantage of designing such a light display as an inexpensive attachment for a standard, hand holdable flashlight assembly that can also be readily attached to a bicycle as a night safety light.

The attractiveness and appeal of whirling light displays for bicycles need no elaboration, particularly where children and teen-age youths are concerned. However, such items are usually considered to be in the category of a novelty item and the cost of such articles must be kept quite low to be competitive with other bicycle attachment products in the marketplace. The present invention is adapted to be inexpensively produced while being simple, durable and adequately sturdy for its intended function.

The present appplicant has also recognized that a whirling propeller light display assembly that can transmit multicolored light at various radial positions of the propellers would have particular sales appeal, and has designed the present invention to permit the colored light effects to be changed at will by providing a changeable set of colored filter elements in the light display unit.

SUMMARY OF THE INVENTION

The present invention is an animated light display featuring a wind driven propeller assembly wherein the propeller blades are each capable of being periodically illuminated interiorly by light radiated from a central, stationary light source. The blades are periodically illuminated due to their being mounted on a hub which is rotatably secured to an axle having light transmitting areas circumferentially spaced about a peripheral area of the axle. The hub also includes light transmitting areas where the propeller blades each join the hub, whereby, as the propeller and hub assembly rotate about the axle, light from a source within the axle is transmitted to each propeller as the individual propellers become radially aligned with a light transmitting area of the axle. The overall effect is a display of an illuminated propeller disc that may be varied in a number of ways.

The light transmitted through each light transmitting area of the axle may be colored differently from the next adjacent area by providing different colored light filters in each area. Any practical number of light transmitting areas may be provided in the axle member. The colored filters may be removable and interchangeable with different colored filters. The total appeal of the present invention and advantages thereof over the prior art will be made more clear in the ensuing description of a preferred embodiment.

DETAILED DESCRIPTION OF A PREFERRED EMBODIMENT

Description of the Drawings

FIG. 1 is an elevational sectional view of a preferred embodiment of light display unit constructed in accordance with the present invention;

FIG. 2 is a sectional view taken along line 2—2 of FIG. 1.

FIG. 3 shows an alternate arrangement of the light filter element incorporated in the present invention, and a variation of propeller hub construction to accommodate the light filter; and FIG. 4 is a sectional view taken along line 4—4 of FIG. 3.

DETAILED DESCRIPTION OF THE PREFERRED EMBODIMENT

With reference to FIGS. 1 and 2, a battery shell 10 includes a switch 12 for completing a circuit between battery units (not shown) normally carried within the shell 10 and light source 14 fixed centrally within a reflector 16 which transmits light axially forwardly of shell 10 through a transparent cover 18. Switch 12 is connected to contact 20 which is engageable with other contact 22 to complete an electrical circuit to bulb 14 in customary fashion when switch 12 is moved to the right as viewed in FIG. 1.

Threadably secured to the front end of shell 10 is an axle member 24 on which a propeller assembly 26 is rotatably mounted. Axle member 24 is generally cylindrical and tubular in form and is constructed so as to be opaque to light emanating from light bulb 14 except for light transmitting areas 28. Light filter elements 30 cover each light transmitting area 28 in the axle member 24, the filters being preferably different colors at least at adjacent light transmitting areas 28.

Propeller assembly 26 includes a number of propeller elements 32 mounted to a propeller hub 34 that is free to rotate about a peripheral portion of axle member 24 as illustrated. Hub 34 is prevented from axially moving off of axle 24 by retainer ring 36 threadably secured to axle 24. An abutment 38 on axle 24 cooperates with ring 36 to axially secure hub 34 to axle member 24. Light transmitting areas 40 are provided in hub 34 where the propellers 32 join the hub 34. The propellers themselves are constructed of light transmitting material or at least partially of light transmitting material and may include a central hollow portion 42.

It will thus be evident that when propellers 32 are radially aligned with light transmitting areas 28, light from bulb 14 will pass radially through areas 28, filters 30, area 40 and propeller 32. Since all other areas of axle 24 or hub 34 are opaque, no light is transmitted from bulb 14 to propellers 32 when the latter are not radially aligned. Thus, when ambient light conditions are dim or dark, light created from energization of bulb 14 will be transmitted axially through cover 18 and radially through areas 28 and 40 periodically as these areas are brought into radial alignment when propeller assembly 26 is rotated by air moving past the propellers. As hub 34 spins on axle 24, the periodic illumination of the propellers by colored light creates an effect of a disc having illuminated radial lines or wedges numbering the same as the number of light transmitting areas 28.

It should be evident that a number of variations of construction are possible while still embodying the concept of the present invention. In FIGS. 3 and 4, colored filters 30 are removably secured within retainers 44 (FIG. 4) on an outer peripheral area of axle member 24. The inner area of hub 34 is channel-shaped to accommodate the filters 30 and retainers 44 whereby the latter do not interfere with free rotation of the hub 34 on axle 24. Notches 46 in the rearward channel sidewall enable assembly of the hub over the filters. The number and spacing of notches 46 is made equal to the number and spacing of filters 30 for this purpose.

Other structural variations are also envisioned. For example, the axle 24 could be supported by any form of configuration of battery shell 10. The bulb 14 could be located substantially anywhere within axle 24. The light transmitting areas 28 could be formed in any manner. They could be simply apertures in axle member 24, or actually window elements formed from suitable light transmitting materials. Preferably, the axle 24 and propeller assembly are formed from plastic resinous materials that are rendered opaque in areas where light transmission is not desired, such as by pigmentation of the plastic or by suitable coatings applied to the surface of the plastic material. The color filters 30 are preferably removable and interchangeable with different colored filters so that the colored light pattern transmitted through the propellers can be readily varied. The light transmitting area 40 in hub 34 can be created in numerous ways. For example, the propellers and hub can be molded from the same, light transmitting plastic material with an opaque coating applied to those areas where light is not to be transmitted. Alternatively, apertures in the hub could provide light transmitting areas for enabling light from the bulb light source to reach the propellers.

A clamp 50 for securing the battery shell and propeller assembly to a bicycle or other vehicle is provided in the preferred embodiment. Also, for decorative purposes, simulated aircraft wing and tail appendages 52, 54 and 56 may be provided, as illustrated in FIG. 1.

It should be noted that the cover member 18 also could be opaque if an axial beam of light were not desired, whereby all the light transmitted from axle 24 would be through the light transmitting areas 28.

The tip areas 53 of propellers 32 are reflectorized to enhance the safety light characteristics of the light display of the present invention.

The use of light conductive plastics is also envisioned where the light transmitting areas of the axle and propeller assembly are described above for obtaining desired effects. For example, a propeller could be constructed from light conducting plastic with certain portions thereof rendered opaque and certain other portions treated to allow light to be transmitted away from the propeller element in any desired pattern.

Still another variation envisioned is the use of an axle element made up as an assembly, whereby the light transmitting and opaque areas at the periphery of the axle element are obtained by placing a separate band of alternating transparent and opaque areas about an otherwise light transmitting axle member. Obviously, numerous methods could be devised to create the axle member of the invention in a suitable manner to obtain alternating light transmitting and opaque areas.

I claim:

1. A decorative light comprising:
   a. an axle member including a hollow, generally cylindrical portion;
   b. said axle member having at least one light transmitting area extending over a limited portion of the periphery of said cylindrical portion;
   c. a light source within said axle member and disposed so that illumination passes through said light transmitting area when said light source is energized;
   d. a propeller assembly including at least one propeller element and a propeller hub rotatably mounted on said axle member, said propeller element including light transmitting material in its construction, said hub including a light transmitting area where the propeller element and hub are joined, said hub being mounted on said axle whereby, when said light source is energized, illumination from said light source is directed through said light transmitting areas of said axle member and hub and through said light transmitting material of said propeller element when said light transmitting area of said axle and said light transmitting material of said propeller are radially aligned and said illumination is not transmitted through said light transmitting material of said propeller element when said light transmitting areas of said axle member and light transmitting material of said propeller are not radially aligned; and
   e. means for energizing said light source.

2. A decorative light as recited in claim 1 further including a color filter in said light transmitting area of said axle member.

3. A decorative light as recited in claim 2, further wherein said axle member includes multiple, circumferentially spaced light transmitting areas, and including different colored filters in adjacent ones of said light transmitting areas.

4. A decorative light as recited in claim 3, further including multiple, circumferentially spaced propeller elements on said propeller hub, each propeller element including light transmitting material in its construction, said hub including light transmitting areas where the propeller elements and hub are joined, whereby when said light source is energized, illumination from said light source is directed through said light transmitting areas of said axle member and said hub and through the light transmitting material of each of said propeller elements when each propeller element is radially aligned with a light transmitting area of said axle member.

5. A decorative light as recited in claim 1 further including a battery shell for supporting said axle member, and a battery power supply within said shell for energizing said light source.

6. A decorative light as recited in claim 5 further including a reflector within said axle member arranged to direct a light beam axially from said axle member from said light source.

7. In a flashlight assembly including an elongated battery shell, a light source and reflector for directing a beam of light axially of said battery shell located at one end of said battery shell, battery power supply means within said shell; switch means for selectively connecting or disconnecting said battery power supply to and from said light source, the improvement comprising:
  a. a hollow, cylindrical axle member located adjacent said light source and connected to said one end of said shell, said axle member including multiple, circumferentially spaced light transmitting areas about its peripheral area, and being opaque about its remaining peripheral area, said axle being disposed with respect to said light source so that illumination from said light source passes through said light transmitting areas when said light source is energized;
  b. a propeller assembly including multiple, circumferentially spaced propeller elements joined to a propeller hub, said hub being rotatably attached to said axle member and covering said light transmitting areas, said propeller elements being constructed of light transmitting material and said hub including light transmitting areas where said propeller elements are joined to said hub and being opaque in its remaining areas, whereby illumination from said light source is transmitted through said propeller elements when each of said propeller elements are radially aligned with a light transmitting area in said axle member.

8. The assembly recited in claim 7, further including a colored light filter covering each light transmitting area of said axle member, with adjacent light transmitting areas having a different colored filter thereover, each of said filters being removable and interchangeable with another filter.

9. The assembly recited in claim 8 further wherein each propeller element includes a reflectorized tip area.

10. The assembly recited in claim 8 wherein said hub includes a channel area on its inner surface, said inner surface being adjacent an outer peripheral surface of said axle member, said color filters being removably secured to said axle outer peripheral surface and disposed within said channel area of said hub when said hub is assembled to said axle member.

* * * * *